(12) United States Patent
Wright

(10) Patent No.: US 8,238,727 B2
(45) Date of Patent: Aug. 7, 2012

(54) METHODS AND APPARATUS TO DETECT A TIME-SHIFT EVENT ASSOCIATED WITH THE PRESENTATION OF MEDIA CONTENT

(75) Inventor: David Howell Wright, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1271 days.

(21) Appl. No.: 11/916,428

(22) PCT Filed: Jun. 3, 2005

(86) PCT No.: PCT/US2005/019613
§ 371 (c)(1),
(2), (4) Date: Dec. 3, 2007

(87) PCT Pub. No.: WO2006/132622
PCT Pub. Date: Dec. 14, 2006

(65) Prior Publication Data
US 2009/0290852 A1    Nov. 26, 2009

(51) Int. Cl.
*H04N 5/783* (2006.01)
(52) U.S. Cl. .......................... 386/343; 386/95
(58) Field of Classification Search ............... 386/95, 386/343
See application file for complete search history.

(56) References Cited

U.S. PATENT DOCUMENTS

| 4,635,138 A * | 1/1987 | Louth ............. 386/343 |
| 4,750,213 A | 6/1988 | Novak |
| 4,752,834 A | 6/1988 | Koombes |
| 4,782,401 A | 11/1988 | Faerber et al. |
| 4,792,864 A | 12/1988 | Watanabe et al. |
| 4,888,638 A | 12/1989 | Bohn |
| 4,931,865 A | 6/1990 | Scarampi |
| 4,943,963 A | 7/1990 | Waechter et al. |
| 5,270,829 A | 12/1993 | Yang |
| 5,333,091 A | 7/1994 | Iggulden et al. |
| 5,481,296 A | 1/1996 | Cragun et al. |
| 5,521,631 A | 5/1996 | Budow et al. |
| 5,535,209 A | 7/1996 | Glaser et al. |

(Continued)

FOREIGN PATENT DOCUMENTS

CA    2323539    10/1999

(Continued)

OTHER PUBLICATIONS

International Preliminary Report on Patentability, issued in corresponding application No. PCT/US05/19613, mailed Jul. 2, 2009, 4 pages.

(Continued)

*Primary Examiner* — Farid Homayounmehr
(74) *Attorney, Agent, or Firm* — Hanley, Flight and Zimmerman, LLC

(57) ABSTRACT

Methods and apparatus to detect a time-shift event associated with the presentation of media content are disclosed. A disclosed system generates a first metering event representative of a first time period in which a program was continuously presented and a second metering event representative of a second time period in which a program was continuously presented. A time-shift detector receives the first and second metering events and calculates a presentation gap value and a broadcast time jump value. The time-shift detector compares the presentation gap value and the broadcast time jump value to determine whether a pause event, a fast forward event or a rewind event occurred.

24 Claims, 7 Drawing Sheets

U.S. PATENT DOCUMENTS

| | | | |
|---|---|---|---|
| 5,661,526 A | 8/1997 | Hammamoto et al. | |
| 5,699,370 A | 12/1997 | Kaniwa et al. | |
| 5,703,655 A | 12/1997 | Corey et al. | |
| 5,819,156 A | 10/1998 | Belmont | |
| 5,838,872 A * | 11/1998 | Kawara | 386/326 |
| 5,999,689 A | 12/1999 | Iggulden | |
| 6,002,443 A | 12/1999 | Iggulden | |
| 6,075,967 A * | 6/2000 | Naimark et al. | 434/307 R |
| 6,184,918 B1 | 2/2001 | Goldschmidt Iki et al. | |
| 6,185,306 B1 * | 2/2001 | Mages et al. | 380/203 |
| 6,208,799 B1 * | 3/2001 | Marsh et al. | 386/292 |
| 6,233,389 B1 | 5/2001 | Barton et al. | |
| 6,343,179 B1 | 1/2002 | Suito et al. | |
| 6,404,977 B1 | 6/2002 | Iggulden | |
| 6,438,314 B1 * | 8/2002 | Akahane | 386/343 |
| 6,513,161 B2 | 1/2003 | Wheeler et al. | |
| 6,564,004 B1 * | 5/2003 | Kadono | 386/314 |
| 6,850,691 B1 | 2/2005 | Stam et al. | |
| 6,973,571 B2 * | 12/2005 | Lee et al. | 713/168 |
| 6,996,711 B2 * | 2/2006 | Patterson et al. | 713/156 |
| 7,057,986 B2 | 6/2006 | Fukuchi | |
| 7,106,944 B2 * | 9/2006 | Graan | 386/343 |
| 7,248,777 B2 | 7/2007 | Feininger et al. | |
| 7,593,620 B2 * | 9/2009 | Surcouf et al. | 386/343 |
| 7,712,114 B2 * | 5/2010 | Ramaswamy | 725/14 |
| 2001/0033343 A1 * | 10/2001 | Yap et al. | 348/734 |
| 2002/0034374 A1 | 3/2002 | Barton | |
| 2002/0056087 A1 | 5/2002 | Berezowski et al. | |
| 2002/0090198 A1 | 7/2002 | Rosenberg et al. | |
| 2002/0120925 A1 | 8/2002 | Logan | |
| 2002/0144262 A1 * | 10/2002 | Plotnick et al. | 725/32 |
| 2003/0045974 A1 * | 3/2003 | Maruyama et al. | 701/1 |
| 2003/0149975 A1 * | 8/2003 | Eldering et al. | 725/34 |
| 2003/0154128 A1 | 8/2003 | Liga et al. | |
| 2004/0250281 A1 | 12/2004 | Feininger et al. | |
| 2005/0091690 A1 | 4/2005 | Delpuch et al. | |
| 2005/0138658 A1 | 6/2005 | Bryan | |
| 2007/0192782 A1 * | 8/2007 | Ramaswamy | 725/9 |
| 2008/0075437 A1 * | 3/2008 | Hamada et al. | 386/126 |
| 2008/0219639 A1 * | 9/2008 | Terashima et al. | 386/68 |
| 2009/0202221 A1 * | 8/2009 | Guo et al. | 386/68 |

FOREIGN PATENT DOCUMENTS

| | | | |
|---|---|---|---|
| DE | 4023866 A1 * | 2/1991 | |
| EP | 1183689 | 3/2002 | |
| EP | 1254561 | 11/2002 | |
| JP | 06168578 A * | 6/1994 | |
| WO | 01/47238 | 6/2001 | |
| WO | 01/47279 | 6/2001 | |
| WO | 2004/051997 | 6/2004 | |
| WO | 2004/100559 | 11/2004 | |
| WO | 2006/014495 | 2/2006 | |

OTHER PUBLICATIONS

International Searching Authority, "International Search Report," PCT/US05/19613, mailed on Apr. 4, 2007, (3 pages).

International Searching Authority, Written Opinion, PCT/US05/19613, mailed on Apr. 4, 2007, (3 pages).

Patent Cooperation Treaty, "International Preliminary Examination Report," issued in connection with PCT application No. PCT/US03/12001, completed Dec. 15, 2003 (3 pages).

United States Patent and Trademark Office, "Restriction Requirement," issued in connection with U.S. Appl. No. 10/483,825, on Jan. 25, 2007 (6 pages).

United States Patent and Trademark Office, "Notice of Allowance," issued in connection with U.S. Appl. No. 10/483,825, on Mar. 9, 2007 (10 pages).

The State Intellectual Property Office of China, "First Office Action," issued on Jul. 3, 2009, in Chinese Patent Application No. 200580051154.2, (11 pages).

Australian Patent Office, "Examiners First Report," issued on Jan. 18, 2010, in Australian Patent Application No. 2005332685, (7 pages).

Mexican Institute of Industrial Property, "Examination Report," issued on Apr. 27, 2010, in Mexican Patent Application No. MX/a/2007/015263, (3 pages).

Australian Patent Office, "Notice of Acceptance," issued on Jan. 19, 2011, in Australian Patent Application No. 2005332685, (3 pages).

* cited by examiner

METHODS AND APPARATUS TO DETECT A TIME-SHIFT EVENT ASSOCIATED WITH THE PRESENTATION OF MEDIA CONTENT

TECHNICAL FIELD

The present disclosure pertains to audience measurement and, more particularly, to methods and apparatus to detect a time-shift event associated with the presentation of media content.

BACKGROUND

Companies that rely on broadcast video and/or audio programs for revenue, such as advertisers, television networks and content providers, wish to know the size and demographic composition of the audience(s) that consume their program(s). Audience measurement companies address this need by measuring the demographic composition of a set of statistically selected households and the program consumption habits of the member(s) of those households. For example, audience measurement companies may collect media consumption data from a selected household by monitoring the content displayed on that household's television(s) and by identifying which household member(s) are watching that content.

Traditionally, broadcast programs have been consumed at the time of broadcast. Therefore, it was safe to assume that audience members using an information presenting device such as a television or radio consumed the entire broadcast stream during the period in which the information presenting device was in use. Recently, however, recording devices such as audio cassette players, video cassette recorders (VCR's), set top boxes (STBs), digital video recorders (DVRs), and personal video recorders (PVRs) such as the TiVo® product and other devices that permit content to be recorded and replayed in accordance with the desires of the audience members have become commonplace. Additionally, the introduction of video on demand (VOD) and internet streaming services allows consumers to request media content to be presented according to their desire. These devices and services have increased the audience members' ability to time-shift the consumption of broadcast programs (i.e., to record a program at the time of broadcast and consume that same program at a later time or to retrieve and present media content at any time). The ability to time-shift media content has also provided the consumer with enhanced power to consume only selected portions of broadcast programs by, for example, skipping or fast-forwarding through portions of recorded content. Some consumers have used this enhanced ability to avoid viewing advertising commercials or other portions of the broadcast program.

DETAILED DESCRIPTION

The example apparatus and methods described herein may be used to facilitate the detection of time-shift events (e.g., fast-forward, rewind, pause) associated with a digital recorder (e.g., a digital or analog tape recorder, a personal video recorder (PVR), a digital video recorder (DVR), a digital versatile disc (DVD) recorder, a digital audio recorder, a video on demand (VOD) service, an internet streaming service, and/or any other system that allows users to time-shift media content. More specifically, the example apparatus and methods employ identifying codes inserted in media content (e.g., codes inserted by media creators, broadcasters, digital recorders, etc.) to determine which, if any, time-shift events have occurred.

In the illustrated example apparatus, media content metering events are generated from identifying data embedded in media content during the transmission, creation, and/or presentation of the media content. A media content metering event (also referred to herein as a metering event) is a data structure that stores information (e.g., start time, duration, encoded broadcast time) about one consecutive presentation of a single media content program on a monitored information presentation device. A new metering event is created when the media content program presented on the monitored information presentation device is changed (e.g., when the consumer chooses to view a different media content program, when a commercial interrupts the media content program, when a first program ends and a new program begins, etc.) New metering events are also created when media content is not played continuously and consecutively (e.g., when a time-shifting event occurs.) The type of time-shift event that has occurred, if any, may be determined by comparing the data stored in consecutively captured metering events. One of ordinary skill in the art will recognize that, while the forgoing description ignores commercial interruptions, commercials may be analyzed as media content in the same manner as any other media content program.

Figure 1:
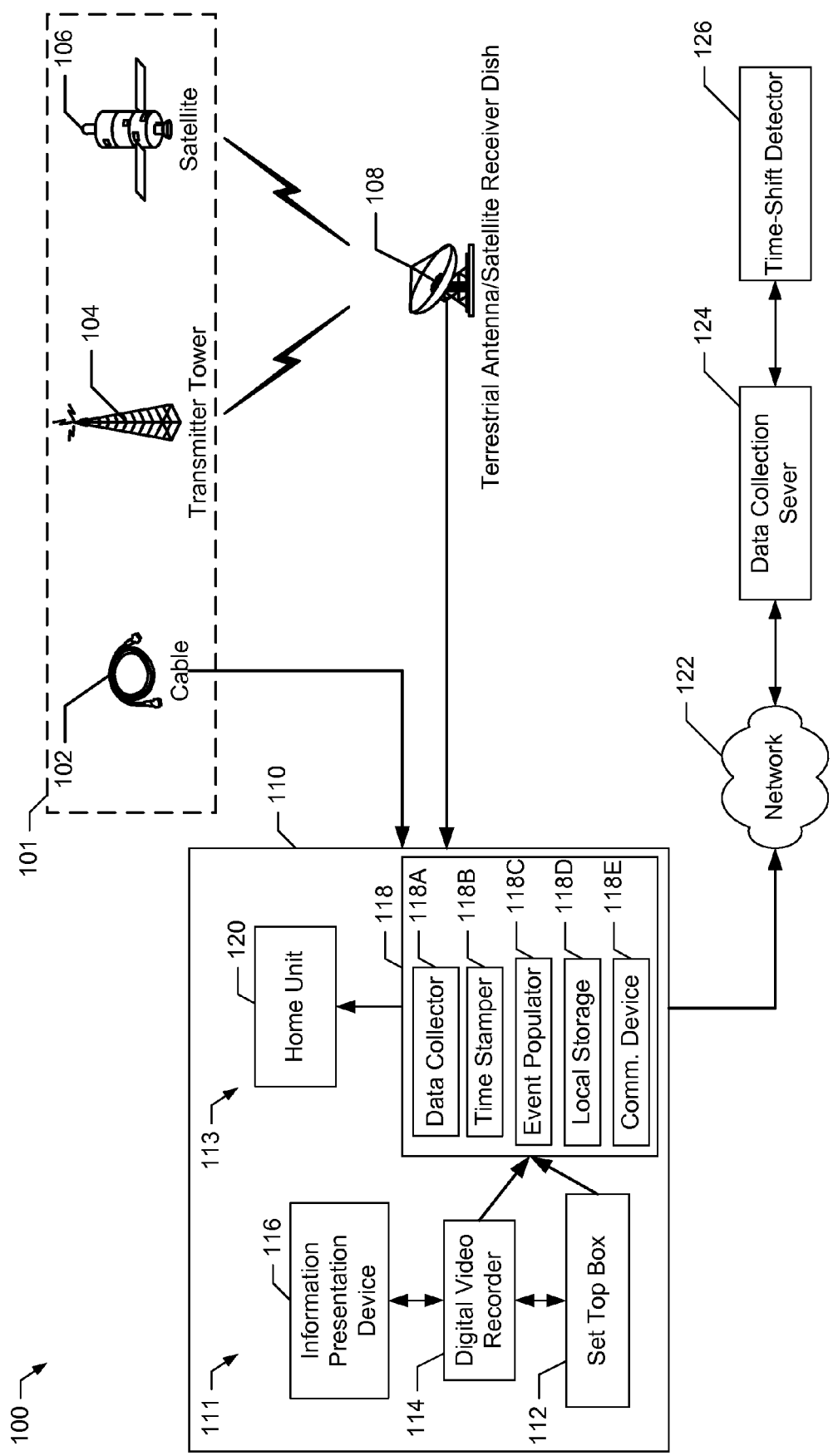
FIG. 1 is a schematic illustration of an example system to detect time-shift events associated with the presentation of media content.

FIG. 1 is a schematic illustration of an example system 100 to detect time-shift events associated with a monitored site 110. In the illustrated example, one or more media content provider(s) 101 deliver content to one or more monitored site(s) 110, each of which includes an entertainment system 111 and a local metering system 113. The local metering system 113 is coupled via a network 122 to a data collection server 124, and a time-shift event detector 126. Although multiple monitored sites 110 will typically be monitored, for ease of discussion the following will refer to a single example monitored site 110.

The media content provider 101 may be implemented by any service provider such as, for example, an internet service provider, a cable television and/or radio service provider 102, a terrestrial television and/or radio service provider 104, and/or a satellite television and/or radio service provider 106, each of which may include VOD. The media content provider 101 may distribute various types of media content to the monitored site 110 including television broadcasts and radio broadcasts. The media content may originate with program content creators such as a television network head-end. The media may then be transmitted to local broadcast stations or cable/satellite providers known as final distributors that are capable of transmitting the media content to the monitored site 110. An example final distributor is represented by the terrestrial antenna/satellite receiver dish 108 of FIG. 1.

The entertainment system 111 of the monitored site 110 receives a plurality of media content signals transmitted on a plurality of channels by the media content provider(s) 101. The entertainment system 111 may be adapted to process and present analog and/or digital media content signals provided in any format such as a National Television Standards Committee (NTSC) television signal format, a phase alternating line (PAL) television signal format, an ATSC signal, etc. The plurality of media content signals may be received by an STB 112, by a DVR 114, by an integrated receiver decoder (IRD) (not shown), and/or by an information presentation device 116 such as a television or a radio.

The monitored site 110 of FIG. 1 may be implemented by any site configured to receive a media content signal from a media content provider 101 and to monitor the presented audio and/or video programming presented on the entertainment system 111 to generate media consumption data. Media consumption data refers to any data that is generated or stored by the monitored site 110 to characterize the way that one or more consumer(s) at the monitored site 110 use media content and is further described below. The monitored site 110 may be, for example, a residential home, a restaurant, a store, etc. that contains the entertainment system 111. Although only one monitored site 110 is illustrated in FIG. 1, a person of ordinary skill in the art will readily appreciate that a plurality of monitored sites (preferably statistically selected to reflect a population of interest) will preferably be employed to generate media consumption data. The monitored site 110 of FIG. 1 includes the entertainment system 111 (including, in this example, STB 112, a DVR 114, and an information presentation device 116), and a local metering system 113 (including, in this example, a metering device 118 and a home unit 120). Although for ease of illustration and discussion, only one entertainment system 111 and one metering system 113 is shown, a person of ordinary skill in the art will appreciate that multiple metering devices 118 metering systems 113, and/or multiple entertainment systems 111 may be employed within the monitored site.

The example information presentation device 116 of FIG. 1 may be implemented by any device configured to present the audio and/or video content contained in the media content signals provided by the media content provider 101 such as, for example, a digital or analog television, a computer monitor, a plasma display screen, a LCD display screen, a radio and/or any other device capable of presenting audio and/or video content.

The example STB 112 of FIG. 1 is a conventional device that is configured to tune and/or process media content signals. It may be implemented, for example, by a cable converter for receiving cable programming or by an integrated receiver/decoder for receiving satellite programming. The received media content signals are processed into audio and/or video signals that are output by the STB 112 and forwarded to the information presentation device 116 and/or to the DVR 114. The STB 112 may process and/or decode the media content signal(s) before they are output. The output of the STB 112 may be in any format such as, for example, the National Television Standards Committee (NTSC) television signal format, the ATSC format, the phase alternating line (PAL) television signal format, and/or any other format that is compatible with the DVR 114 and/or the information presentation device 116. Persons of ordinary skill in the art will appreciate that, in some implementations, the STB 112 may not be present. For example, in some instances, the DVR 114 or the information presentation device 116 provides the functionality of the STB 112 such that the STB 112 and the DVR 114 or the STB 112 and the information presentation device 116 are implemented by a single device.

The example DVR 114 of FIG. 1 is configured to receive the signal output by the STB 112 or a media content signal received directly from the media content provider 101 and to record media content contained in the media content signal. The illustrated DVR 114 is configured to digitally record media content to an internal memory device such as a hard drive. In addition to recording media content, the DVR 114 is also configured to play back recorded media content and to perform time-shift tricks (e.g., pausing the media content, fast forwarding the media content, rewinding the media content, slow-motion playback of the media content, etc.) during playback of the media content. For example, a consumer may decide to pause a program currently being presented and to resume playback of the program at a later time. The output of the DVR 114 may be sent to the information presentation device 116 in any desired format (e.g., the National Television Standards Committee (NTSC) television signal format, the ATSC format, or the phase alternating line (PAL) television signal format). As used herein, the term "digital video recorder" is defined to include digital video recorders (DVRs), personal video recorders (PVRs), a computer with a television tuning card configured to capture television content, etc. Additionally, a digital audio recorder may be substituted for the DVR 114 to record audio content such as satellite radio audio content. The DVR 114 is well known to those of ordinary skill in the art and is not further described herein.

The example metering device 118 illustrated in FIG. 1 is configured to monitor the signals output by the STB 112 and/or the signals output by the DVR 114 to collect and/or store media consumption data. The illustrated metering device 118 includes data collector 118A, time stamper 118B, event populator 118C, local storage 118D, and communication device 118E. The illustrated metering device 118 detects the tuning status of a tuning device disposed in the STB 112 and/or monitors the signal output by the STB 112 and/or the signal output by the DVR 114 to extract identifying data embedded in those signals. Alternatively or additionally, the metering device 118 of FIG. 1 generates identifying data from the received audio and/or video signals. The metering device 118 uses collected and/or generated data to create content metering events, each of which represents the uninterrupted consumption of particular media content. Metering events will be explained in further detail below. The metering device 118 transmits the metering events to the home unit 120, the data collection server 124, and/or to any other location capable of receiving such events. One of ordinary skill in the art will recognize that the example metering device 118 may include other functionality and components similar to known metering devices. Likewise, the example metering device 118 may be capable of monitoring audience measurement data other than the data used in the metering events.

The data collector 118A is capable of extracting identifying data such as ancillary identification codes and timestamps, source identifier data (SID), watermark data, metadata, etc. that may be embedded in the video, audio data (e.g., closed captioning text), and/or control signals (e.g., electronic program guide data) provided by the media content provider 101 and/or output by the STB 112, the DVR 114, and/or the information presentation device 116. The identifying data may contain information associated with programming contained in the audio, video, data and/or control signals such as title, length information, owner, and time and date information (i.e., time stamp data), etc. The time and date information may be associated with the production, transmission, and/or the encoding of the identifying data. The identifying data may be inserted into the video and/or audio signals by the media content creator, the network head-end, the final content distributor, the media content provider 101, the DVR 114, the STB 112, the metering device 118, or any other entity that processes, transmits, handles, and/or broadcasts the media content.

To detect, generate, and/or extract the identifying data associated with media content presented on the information presentation device 116, the data collector 118A may, for example, analyze a vertical blanking interval (VBI) to detect embedded codes, analyze watermark data found in the audio, video data or control signals, generate a signature (e.g., data which is uniquely characteristic of the media content signal or a portion thereof), etc. The technique employed depends on the format of the signal analyzed and the encoding technique used to insert the identification data in the signal and/or the signaturing technique used to represent the signal.

Persons of ordinary skill in the art will appreciate that there are numerous known methods for obtaining identifying data from a tuned program. For example, it is known to embed program identification codes and timestamps in the vertical blanking interval of analog television signals, and to extract those codes to identify the program tuned by an analog television set. It is also known to embed audible codes in a broadcast program that are not intended to be detected by a human ear, but may be detected by an electronic listening device positioned to detect sound output by a speaker associated with an information presenting device. As another example, it is known to extract the SIDS and timestamps used with multiplexed digital broadcast streams to identify which of a plurality of programs carried in the multiplexed stream is being presented on an information presentation device. As still another example, it is known to create a proxy for a program (sometimes referred to as a program signature) and to compare that proxy to a database of known proxies to identify a program presented on an information presenting device. These and other techniques may be used alone or in combination to extract program identification data identifying a program presented on an information presenting device. The precise manner chosen to collect that identification data is immaterial to the present invention.

To associate a current time with media content, the metering device 118 includes the time stamper 118B. As media content is received and/or presented, the time stamper 118B may monitor an internal clock or use any other method to determine the current time. The time may be retrieved as the local time at the location of the monitored site 110, Greenwich Mean Time (GMT), a measurement of elapsed time since an initial time, or any other value for quantifying time.

The event populator 118C uses the identifying data extracted by the data collector 118A, generated by the time stamper 118B, or retrieved from any other available source to create content metering events. A metering event is a data structure that stores identifying data about a period of time in which a given media program is continuously presented in real-time (i.e., no fast forwarding, rewinding, pausing, or media content presentation changes (e.g., channel changes, etc.) occur) by the information presentation device 116. For a metering event to be created, the same program must be viewed for a period of time because each metering event corresponds to one uninterrupted viewing of that program. A metering event is completed and the duration of the presentation of the media content is stored when the presented program changes (e.g., the household selects another program (i.e., a channel change occurs), a commercial (or other intervening content) is presented, the current program ends, etc.) or a time-shifting trick occurs (e.g., pause, rewind, fast-forward). The metering events may be stored in the local storage 118D and/or transmitted via the communication device 118E to the home unit 120, data collection server 124, and/or to any other location capable of receiving data.

Figure 2:
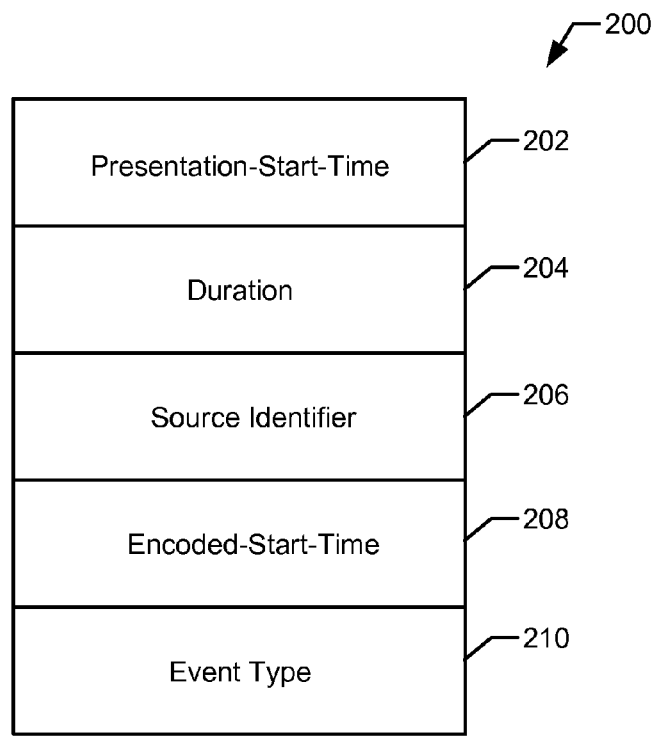
FIG. 2 is a schematic illustration of an example metering event data structure.

An example metering event data structure 200 is illustrated in FIG. 2. The example metering event data structure includes a field to contain a time when the media content is/was presented by the information presentation device 116 (e.g., a presentation-start-time 202 generated by the time stamper 118B of the metering device 118), a length of time that the media content is presented on the information presenting device 116 (e.g., a duration 204), a unique identifier associated with the media content or distributor (e.g., a SID 206), a time associated with the broadcasting/encoding of the television programming (e.g., a broadcast-start-time 208), and a media event type (e.g., event type 210). A person of ordinary skill in the art will readily appreciate that the fields illustrated in the example metering event data structure 200 are examples. Other data structure(s) with different field(s) may likewise be employed in addition to or in place of the fields shown in FIG. 2.

The event populator 118C of the illustrated example collects and analyzes the identifying data to populate the fields of the example metering event data structure 200. For example, the event populator 118C may determine the event type 210 by analyzing the identifying data. For instance, if the identifying data indicates that the identifying data was inserted by the network head-end or content creator, the event type 210 will indicate that the metering event data structure 200 is a program content metering event. Conversely, if the identifying data indicates that the identification data was inserted by a final distributor (e.g., media content provider(s) 101), the event type 210 may indicate that the metering event data structure 200 is a final distributor metering event. Event type data is used to ensure that data contained in metering events is properly understood. For example, timestamp data inserted by a network head end and time stamp data inserted by a final distributor may not be calibrated relative to each other and, thus, cannot be compared to provide meaningful data.

The event populator 118C uses data extracted by the data collector 118A and/or generated by the time stamper 118B to determine the broadcast-start-time 208 and/or the presentation-start-time 202 of the media content. The presentation-start-time 202 is the time at which presentation of the media content begins on the information presentation device 116 being monitored and is usually generated by the time stamper 118B. The broadcast-start-time 208 is the time the television program was broadcast/encoded by the television service provider 101 or the final distributor 108 and is usually extracted from the media content by the data collector 118A. The presentation-start-time 202 and the broadcast-start-time 208 will be equal or approximately equal if a program is viewed at the same time or substantially the same time the program is broadcast. Of course, distribution delays that occur in content distribution systems (e.g., distribution via satellite) may cause a delay between the encoding time and the actual viewing time. The presentation-start-time 202 and the broadcast-start-time 208 will differ significantly if the program is recorded and then viewed at a later time. The broadcast-start-time 208 and the presentation-start-time 202 may be recorded in units of seconds, fractions of seconds, and/or any other unit for measuring time durations.

To determine the duration 204 for which the media content is presented on the information presentation device 116, the metering device 118 of the illustrated example collects and analyzes identifying data from the media content and/or analyzes an internal clock. As noted above, metering events are generated whenever a time-shift event occurs and/or whenever the program presented on the monitored information presentation device 116 is changed. The metering device 118 may determine that a time-shift event has occurred by, for example, monitoring the time data embedded in the media content identifying data. The metering device 118 may determine that the presented program has changed by, for example, monitoring the identifying data embedded in the presented content or its associated control system (e.g., the SID). If the received time is not continuous (e.g., the time does not change or the time jumps in a non-continuous manner), or if the SID of the presented program changes, the metering device 118 records the time that has expired since the presentation-start-time 202 in the duration field 204 to thereby complete the current metering event.

Returning to FIG. 1, the illustrated home unit 120 is a well-known, conventional store and forward device. The illustrated home unit 120 receives and stores media consumption data (e.g., metering events and/or other identifying data) collected by one or more metering devices 118 located at the monitored site 110. The home unit 120 is configured to aperiodically, periodically, or continuously transmit the media consumption data to the data collection server 124 via the network 122. The network 122 may be any type of public or private network, such as, for example, the internet, a LAN, a telephone network, a cable network, and/or a wireless network. The home unit 120 may communicate with the data collection server 124 and transmit the collected media consumption data to the data collection server 124 via any network protocol. For example, the home unit 120 may use a file transfer protocol (FTP) or email to transfer the collected media consumption data and/or metering events to the data collection server 124.

The data collection server 124 of the illustrated example is a server that is configured to receive and process the media consumption data collected by the metering device 118. The data collection server 124 may be configured to generate statistical reports of interest to, for example, media content providers 101. The data collection server 124 may also be configured to transmit the collected media consumption data including metering events to the time-shift event detector 126 for analysis.

The time-shift event detector 126 of the illustrated example is configured to analyze the metering events contained in the media consumption data received from the data collection server 124 to determine if a time-shift event (e.g., a pause event, a fast forward event, a rewind event, etc.) has occurred. The time-shift event detector 126 may detect a time-shift event by calculating differences between the presentation times and the broadcast times of consecutive metering events of the same event type to determine a temporal relationship associated with the metering events. For example, the time-shift event detector 126 may compare the time differences between the presentation times and the broadcast times of two consecutive metering events to predetermined thresholds to determine if a time-shift event has occurred. The illustrated time-shift event detector 126 is also configured to transmit messages to the data collection server 124 to indicate a time-shift event has occurred. An example time-shift event detector 126 is described in detail below in conjunction with FIG. 3.

Figure 3:
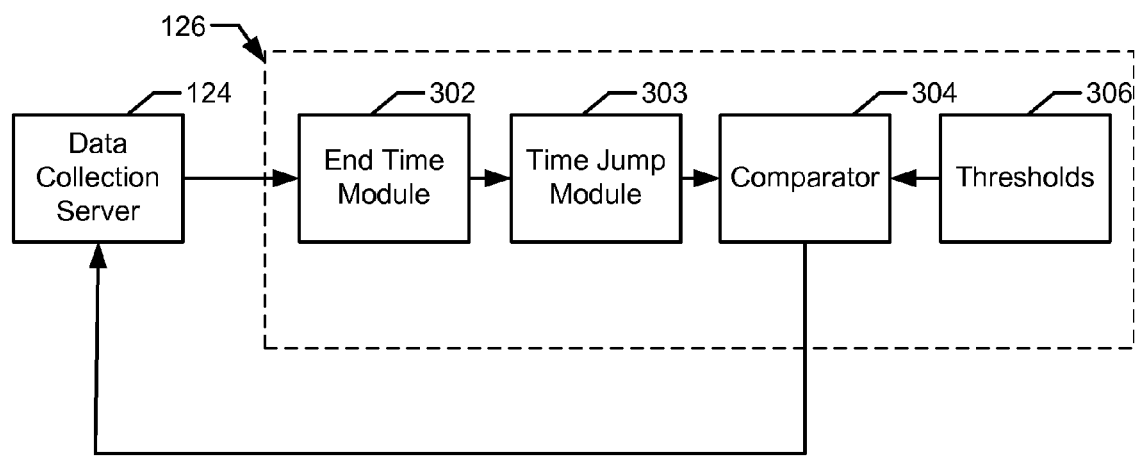
FIG. 3 is a more detailed block diagram of an example time-shift event detector (shown in FIG. 1).

FIG. 3 is a block diagram of an example time-shift event detector 126. The example time-shift event detector 126 of FIG. 3 includes an end time module 302, a time jump module 303, a comparator 304, and a set of thresholds 306. The example time-shift event detector 126 may be implemented as several components of hardware, each configured to perform one or more functions, may be implemented in software or firmware in which one or more programs are used to perform the different functions, or may be implemented by a combination of hardware, firmware, and/or software. The example time-shift event detector 126 may be implemented in a metering device at a consumption site, at the data collection server, and/or any other location.

The end time module 302 is configured to calculate the end times for metering events that are received from the data collection server 124. The presentation-end-time is calculated by adding the presentation-start-time 202 to the duration 204. The presentation-end-time is the local time that the media content presentation of the media content was stopped or interrupted by a commercial or time-shift trick. The broadcast-end-time is calculated by adding the broadcast-start-time 208 to the duration 204. The broadcast-end-time corresponds to the time when the broadcast and/or reception of the media content was stopped or interrupted by a commercial or time-shift trick.

The example time jump module 303 calculates time differences between the respective presentation start times and the respective broadcast start times of two successive metering events of the same event type and associated with the same media content. More specifically, the time jump module 303 of the illustrated example calculates an event gap time (e.g., a difference between the presentation-start-time of a given metering event and the presentation-end-time of the immediately prior metering event) and a broadcast time jump (e.g., a difference between the broadcast-start-time of the given metering event and the broadcast-end-time of the immediately prior metering event). The event gap time is the amount of actual time that passes between the two successive metering events. For example, if the presentation of some media content is interrupted by a five second commercial, there will be a five second event gap time between a metering event associated with the presentation of the media content at a time before the commercial and a second metering event corresponding to the presentation of the same media content at a time after the commercial. The broadcast time jump is the change in the broadcast time between two successive metering events. For example, if some media content is presented and then five seconds of that same content is skipped by fast forwarding, there will be a broadcast time jump of five seconds between a metering event associated with the presentation of the media before the fast-forwarding and a second metering associated with the presentation of the media after the fast-forwarding. The event gap time and the broadcast time jump will be explained in further detail in conjunction with the description of FIGS. 4 and 5.

The example comparator 304 of FIG. 3 may be implemented using the processor 906 of FIG. 9, described in detail below. The comparator 304 is configured to analyze the metering events received by the example time-shift event detector 126 to determine if a time-shift event has occurred. In particular, the comparator 304 compares the calculated event gap time and the broadcast time jump for a pair of metering events to data from the threshold table 306 to determine if a time-shift event has occurred. The thresholds may be static, may be dynamically determined by an adaptive software process, may be provided by the user, and/or may be derived by any other method. The threshold table 306 may contain thresholds associated with a pause event, a fast forward event, and/or a rewind event. These thresholds may be derived from an average amount of time that it takes for media content to travel from the head-end or broadcaster to the monitored site 110, from empirical data corresponding to ideal times, or from any other method. A person of ordinary skill in the art will readily appreciate that there are many methods to implement the threshold table 306 such as hardware registers and/or any other memory devices.

In addition, the comparator 304 may be configured to filter the metering events to eliminate false detection of time-shift events. For example, the comparator 302 may filter the metering events by identifying the metering events that are not both of the same metering event type (e.g., program content metering events and final distributor metering events), by identifying metering events that are not associated with the same program, etc. Metering events associated with different programs and/or different event types should not be compared because the embedded times are not synchronized and their comparison is, thus, meaningless.

Figure 4:
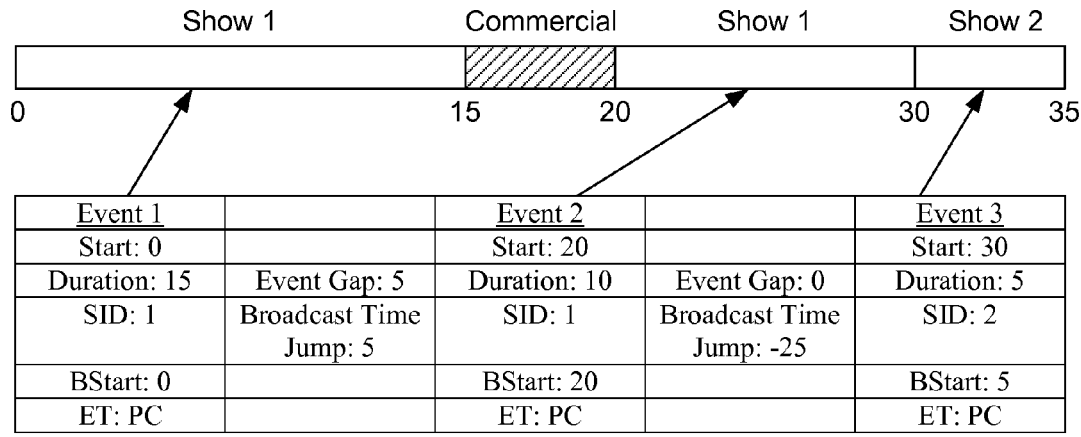
FIG. 4 is a chart illustrating a correlation between multiple content metering events and a series of media content programs.
Figure 5:
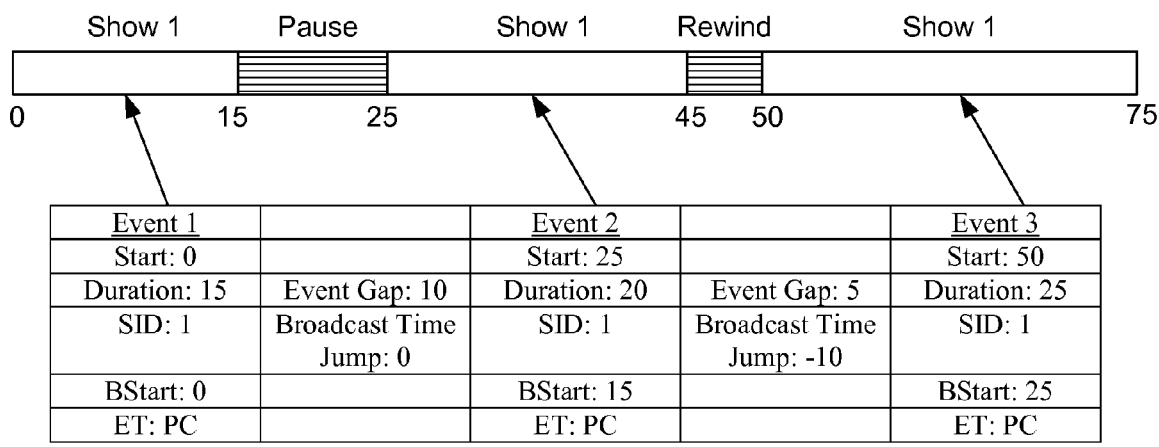
FIG. 5 is a chart illustrating a correlation between multiple content metering events and a series of media content programs.

FIGS. 4 and 5 are charts illustrating the correlation between media content series and example content metering events. FIG. 4 shows a time series wherein Show 1 having SID 1 is presented for 15 minutes, a commercial is presented for 5 minutes, Show 1 is presented for another 10 minutes, and then show 2 is presented. Show 2 may be presented because Show 1 has ended or because the user selected to change presentation to Show 2. As shown in FIG. 4, Event 1 is associated with the presentation of Show 1 prior to the commercial. The presentation-start-time (start) is zero for the example, however, the presentation start time may correspond to an actual time at which media presentation begins. The duration of Event 1 is fifteen because Show 1 was presented for 15 minutes before the commercial interruption. The broadcast-start-time (BStart) is zero indicating that media content is being presented at the same time that it is broadcast. The example event-type (ET) is program content (PC) indicating the broadcast-start-time was encoded by the broadcast head-end. Similarly, Event 2 corresponds to the presentation of Show 1 following the commercial and Event 3 corresponds to the presentation of Show 2.

FIG. 4 additionally shows values for event gap time and broadcast time jump. The event gap time between Event 1 and Event 2 is calculated by subtracting the presentation-start-time of Event 2 (20) from the presentation-end-time of Event 1 (15). The event gap time of five indicates that five actual minutes passed between the two events (i.e., the five minutes during which the commercial was presented). The broadcast time jump between Event 1 and Event 2 is calculated by subtracting the broadcast-start-time of Event 2 (20) from the broadcast-end-time of Event 1 (15). The broadcast time jump of five indicates that five minutes of broadcast media content was presented between the two events (i.e., the five minutes of media content in the commercial). Similarly, the event gap time and the broadcast time jump may be calculated for Event 2 and Event 3. However, the time-shift detector 126 will not compare these events because the SID value of the two metering events differ.

FIG. 5 illustrates a second time series wherein Show 1 is presented for 15 minutes, Show 1 is paused for 10 minutes, Show 1 is presented for 20 minutes, Show 1 is rewound at double speed 10 minutes which takes five minutes, and Show 1 is presented for an additional 25 minutes. Event 1 is associated with the presentation of Show 1 before the pause time-shift trick, Event 2 is associated with the presentation of Show 1 after the pause time-shift trick, and Event 3 is associated with the presentation of Show 1 after the rewind time-shift trick.

The event gap time and the broadcast time jump are calculated in the same manner as the events in FIGS. 4-5. As FIG. 5 shows, the event gap time and the broadcast time jump calculated for Event 1 and Event 2 are different in the illustrated example. The difference exists because the pause time-shift trick caused the broadcast time to stop (i.e., the media content was no longer presented) while the actual time that expired between Event 1 and Event 2 was 10 minutes. Likewise, for Event 2 and Event 3 the time jump was negative because the media content was rewound 10 minutes, while the event gap time was 5 minutes because the rewinding time-shift trick took five minutes to complete. Details regarding the characteristics of different time-shift tricks will be presented in detail below.

As shown in FIGS. 4-5, the example system does not generate metering events for commercials in the media content; however, metering events could be generated for commercials. The metering events generated for commercials may be ignored by the time-shift detector 126 to enable detection of time-shift events. For example, the metering events associated with a commercial may be dropped by the time-shift event detector 126 so that the metering events before and after the commercial may be analyzed. Alternatively, the metering events for a commercial may be analyzed in the same manner that other programs are analyzed to determine if any time-shift events occurred during a commercial.

Figure 6:
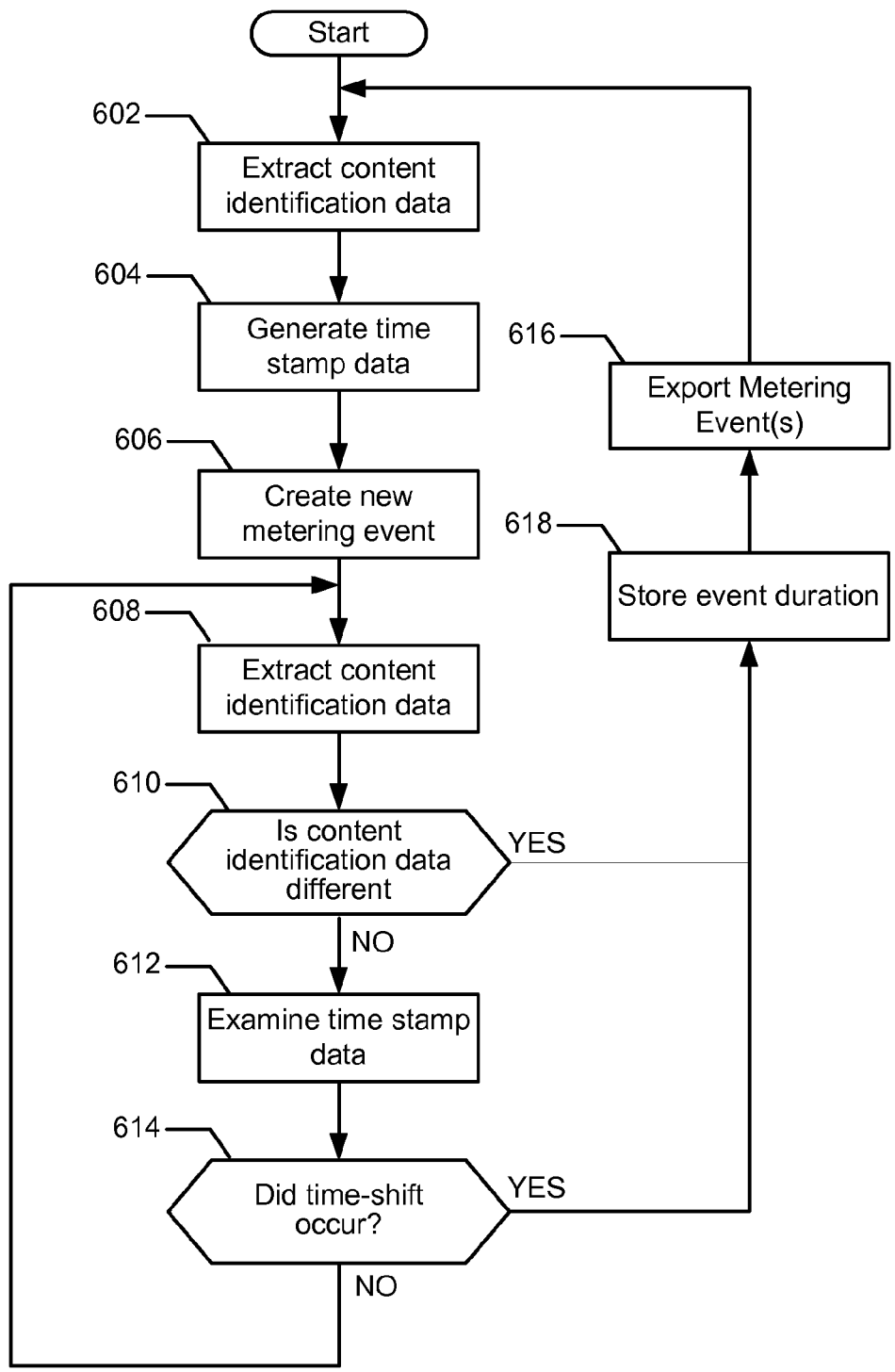
FIG. 6 is flowchart representative of example machine readable instructions which may be executed to implement a portion of the metering device of FIG. 1.
Figure 7:
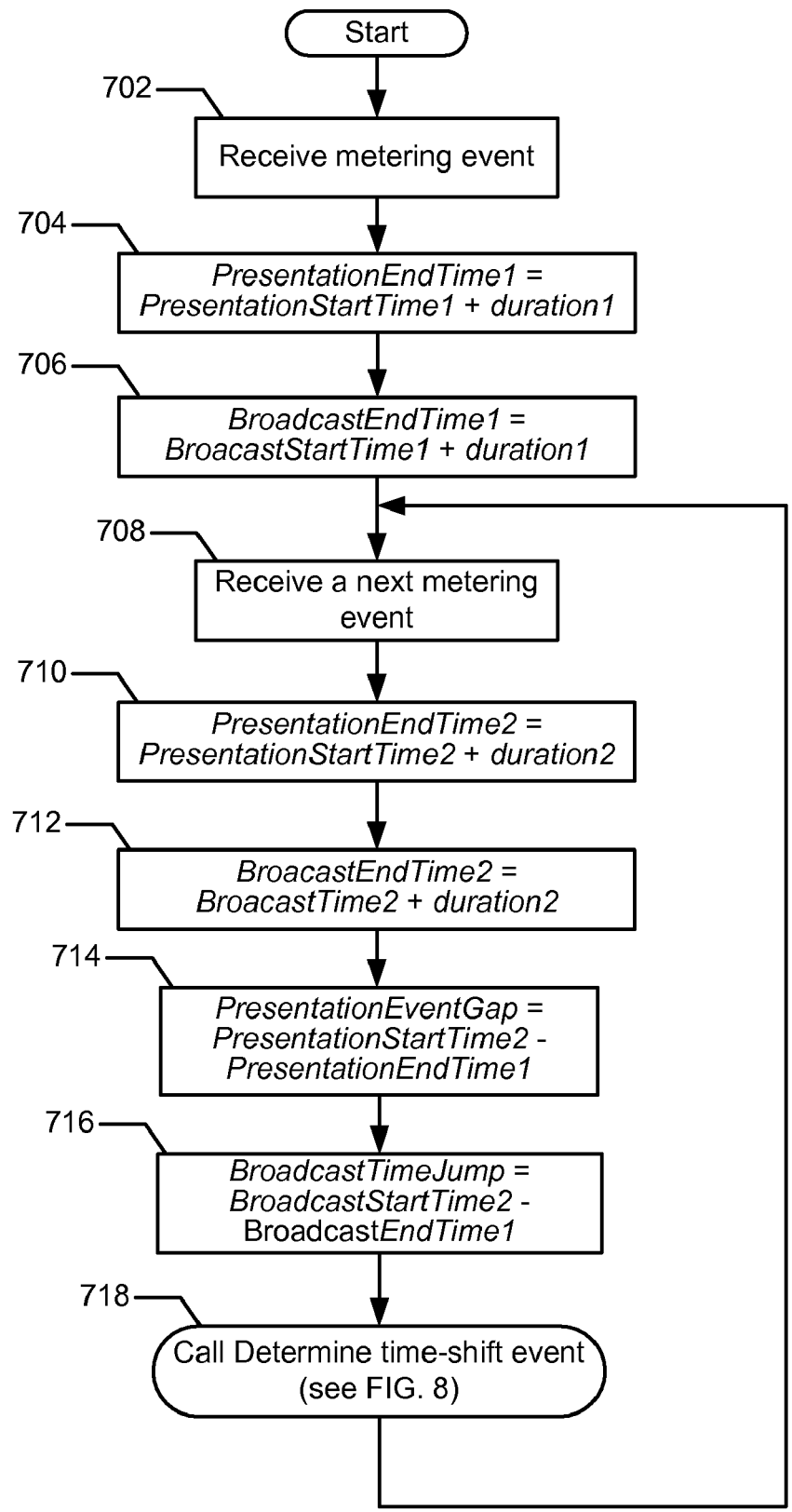
FIG. 7 is a flowchart representative of example machine readable instructions which may be executed to implement the time-shift detector of FIG. 1.
Figure 8:
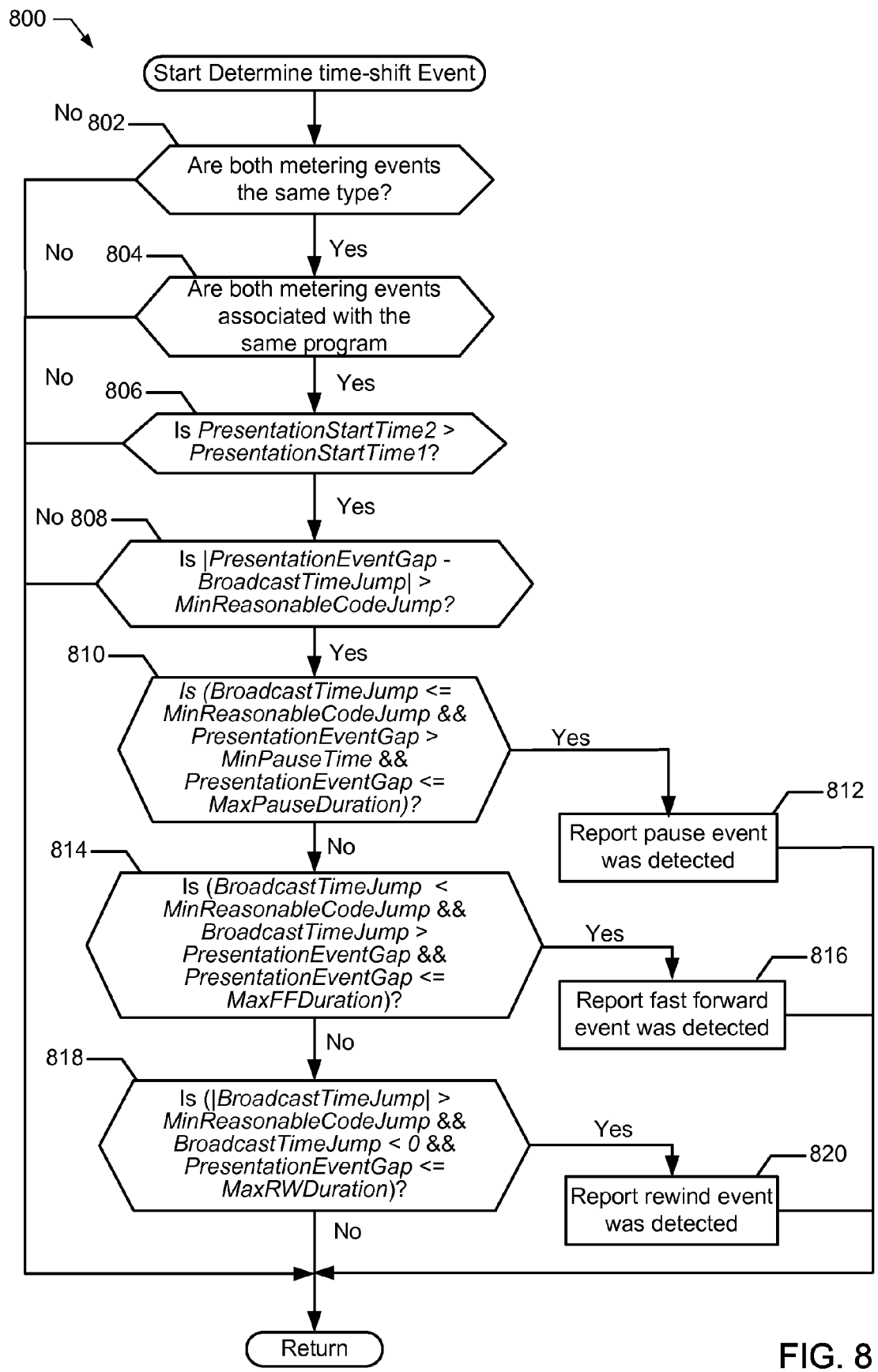
FIG. 8 is a flowchart representative of example machine readable instructions which may be executed to implement the time-shift event detection process of FIG. 7.

A flowchart representative of example machine readable instructions for implementing the apparatus 118, 124 and/or 126 of FIGS. 1 and 3 is shown in FIGS. 6-8. In this example, the machine readable instructions comprise a program for execution by a processor such as the processor 906 shown in the example computer 900 discussed below in connection with FIG. 9. The program may be embodied in software stored on a tangible medium such as a CD-ROM, a floppy disk, a hard drive, a digital versatile disk (DVD), or a memory associated with the processor 906, but persons of ordinary skill in the art will readily appreciate that the entire program and/or parts thereof could alternatively be executed by a device other than the processor 906 and/or embodied in firmware or dedicated hardware in a well known manner. For example, any or all of the metering device 118, data collector 118A, time stamper 118B, event populator 118C, local storage 118D, communication device 118E, data collection server 124, time-shift detector 126, end time module 302, time jump module 303, comparator 304, and thresholds 306 could be implemented by software, hardware, and/or firmware. Further, although the example program is described with reference to the flowcharts illustrated in FIGS. 6-8, persons of ordinary skill in the art will readily appreciate that many other methods of implementing the example apparatus 118, 124 and/or 126 may alternatively be used. For example, the order of execution of the blocks may be changed, and/or some of the blocks described may be changed, eliminated, or combined.

The program of FIG. 6 begins when the data collector 118A extracts content identification data from media content presented on a monitored information presentation device (block 602). Next, the time stamper 118B generates timestamp data to indicate the time that the media content was presented at the monitored site 110 (block 604). The event populator 118C then creates a new metering event storing the presentation-start-time, source identifier, broadcast-start-time, and event-type that were extracted during blocks 602 and 604 (block 606). The metering device 118 then continues to sample the media content by extracting content identification data and comparing it to the content identification data in the content metering event (block 608). If the content identification data does not match the content identification data previously extracted (e.g., the SID changes) it is assumed that the media content has changed and control proceeds to block 618 at which the duration of the event is stored. Otherwise, the metering device 118 examines the encoded time-stamp data (block 612). If the encoded time-stamp data is not consecutive, but, rather, indicates a significant jump in time compared with the previous extracted time-stamp data, a time-shift event has occurred and control proceeds to block 618 to complete the current metering event and create a new one. Otherwise, control returns to block 608 to process the next sample.

When control has moved to block 618, the metering event has ended because a time-shift trick has occurred or the presented media content has changed. Therefore, the amount of time that has elapsed since the start of the current metering event is recorded in the duration field (block 618). The completed metering event is then transferred to the home unit 120, stored at the metering device 118 in the local storage 118D, and/or transmitted to the data collection server 124 using the communication device 118E (block 616).

The example program of FIG. 7 may be used to implement the time-shift detector 126. The program of FIG. 7 begins when a first metering event is received from the data collection server 124 (block 702). The end time module 302 then calculates the presentation-end-time (PresentationEndTime1) of the first metering event by adding the presentation-start-time (PresentationStartTime1) to the duration (duration1) specified in the first metering event (block 704). The end time module calculates the broadcast-end-time (BroadcastEndTime1) by adding the encoded-start-time (BroadcastStartTime1) to the duration (duration1) specified in the first metering event (block 706). The time-shift detector 126 then receives a second metering event (block 708). The end time module 302 then calculates the presentation-end-time (PresenationEndTime2) of the second metering event by adding the presentation-start-time (PresentationStartTime2) to the duration (duration2) specified in the second metering event (block 710). The end time module calculates the broadcast-end-time (BroadcastEndTime2) by adding the broadcast-start-time (BroadcastStartTime2) to the duration (duration2) specified in the second metering event (block 712). The time jump module 303 then calculates the event gap time (PresentationEventGap) by subtracting the presentation-start-time of the second metering event from the presentation-end-time of the first metering event (block 714). The time jump module 303 then calculates the broadcast time jump (BroadcastTimeJump) by subtracting the broadcast-end-time of the first metering event from the broadcast-start-time of the second metering (block 716). Then, the calculated values are passed to the comparator 304 and the Determine Time-Shift Event procedure shown in FIG. 8 is called (block 718).

The example Determine Time-Shift Event process 800 of FIG. 8 begins by determining whether the two metering events Event1 and Event2 are the same type of metering events (e.g., both are program content metering events or both are final distributor metering events) (block 802). If the metering events Event1 and Event2 are different types of metering events, they cannot be used as a combination to determine time shift-events (block 802) and control returns to block 708, wherein the next metering event is received and analyzed in conjunction with the most recently received prior event (i.e., Event2 and a next event Event3 are analyzed in combination).

If the two metering events Event1 and Event2 are the same type of metering event, control advances to block 804 and the process 800 determines whether both metering events Event1 and Event2 are associated with the same program (block 804). The comparator 304 may determine whether both metering events Event1 and Event2 are associated with the same media content by examining the contents of fields SID1 and SID2 to determine if the SIDs contained therein are the same (i.e., Event1 and Event2 are associated with the same program). If SID1 is equal to SID2 and the media content tuning status associated with each of the metering events is equal, then the comparator 304 determines that both metering events Event1 and Event2 are associated with the same media content. If the metering events Event1 and Event2 are not associated with the same media content, they cannot be used to determine time-shift events (block 804) and control returns to block 708, wherein the next metering event is received and analyzed in conjunction with the most recently received prior event (i.e., Event2 and a next event Event3 are analyzed in combination).

If the metering events Event1 and Event2 are associated with the same media content (block 804), the comparator 304 determines whether the second metering event Event2 follows the first metering event Event1 in time (block 806). For error checking, the comparator 304 may determine whether the second metering event Event2 follows the first metering event Event1 in time by comparing the presentation-start-time of the second eventPresentationStartTime2 and the presentation-start-time of the first event PresentationStartTime1. If the presentation-start-time PresentationStartTime2 is less than the presentation-start-time PresentationStartTime1 (i.e., PresentationStartTime2<PresentationStartTime1), then the second metering event Event2 does not follow the first metering event Event1 and control returns to block 708, wherein the next metering event is received and analyzed in conjunction with the most recently received prior event (i.e., Event2 and a next event Event3 are analyzed in combination).

If the presentation-start-time PresentationStartTime2 of the second event is greater than the presentation-start-time PresentationStartTime1 of the first event (e.g., PresentationStartTime2>PresentationStartTime1) (block 806), then the comparator 304 determines that the second metering event Event2 follows the first metering event Event1 in time and control advances to block 808.

The comparator 304 then attempts to eliminate false time-shift events by determining if the difference between the event gap time PresentationEventGap and the broadcast time jump BroadcastTimeJump is greater than a predetermined minimum time-shift threshold (e.g., MinReasonableCodeJump) (block 808). Without this check, time-shift events may incorrectly be reported when there is a delay between the time that the media content is broadcast and the time that the media content is presented (i.e., satellite transmission time). The difference between the event gap time and the broadcast time jump can be calculated using the following equation:

$$|PresentationEventGap-BroadcastTimeJump|>MinReasonableCodeJump$$

The value of MinReasonableCodeJump may be equal to the typical difference between the time the media content is received at a viewing site and the time the television program is broadcast/encoded (e.g., 3 seconds) or may be any other value that reduces the number of false time-shift events detected. If the difference between the event gap time PresentationEventGap and the broadcast time jump BroadcastTimeJump is not greater than the MinReasonableCodeJump (block 808), control returns to block 708 of FIG. 7, wherein the next metering event is received and analyzed in conjunction with the most recently received prior event.

If MinReasonableCodeJump criterion is met (block 808), the comparator 304 attempts to detect a pause event (block 810). A pause event may be detected by determining whether the broadcast time jump (e.g., BroadcastTimeJump) is less than or equal to the minimum reasonable code jump (e.g., MinReasonableCodeJump) and whether the time difference between the presentation end time of the first metering event Event1 and the presentation start time of the second metering event Event2 (e.g., PresentationEventGap) is larger than a predetermined minimum pause threshold (e.g., MinPauseTime) and less than or equal to a predetermined maximum pause threshold (e.g., MaxPauseTime). Using this calculation, a pause event is detected when no media content has been skipped between the two events but there is a gap in the presentation time. The MinPauseTime may be equal to five seconds and the MaxPauseTime may be equal to 7200 seconds. A person of ordinary skill in the art will readily appreciate that the values of the MinPauseTime and the MaxPauseTime listed above are merely examples and other values may be chosen. The comparator 304 may determine if a pause event has occurred using the equation:

(BroadcastTimeJump<=MinReasonableCodeJump)
&& (PresentationEventGap>=MinPauseTime)
&& (PresentationEventGap<=MaxPauseTime).

If the comparator 304 determines a pause event was not detected (i.e., the above evaluation was false) (block 810), control advances to block 814. Otherwise, the comparator 304 transmits a message to the data collection server 124 to indicate that a pause event was detected and the program was paused for PresentationEventGap seconds (block 812) and control returns to block 708 of FIG. 7. The comparator 304 may use any communication protocol to transmit the message to the data collection server 124. For example, a RS-232 protocol may be used to transmit the message to the data collection server 124.

If a pause event is not detected (block 810), the comparator 304 then attempts to detect a fast forward event (block 814). A fast forward event may be detected by comparing the broadcast time jump BroadcastTimeJump and the event gap time PresentationEventGap to one another and to predetermined thresholds. For example, the comparator 304 may determine whether the broadcast time jump BroadcastTimeJump is less than a predetermined minimum reasonable code jump (e.g., MinReasonableCodeJump), whether the BroadcastTimeJump is greater than PresentationEventGap, and whether the PresentationEventGap is less than or equal to a predetermined maximum fast forward duration MaxFFDuration. Using this calculation, a fast forward event is detected when the gap between the encoded times of metering events is greater than the amount of time that elapsed between the metering events, provided that the error checking for reasonable code jumps and maximum fast forward duration is satisfied. The comparator 304 may assume a user will not fast forward for more than five minutes and therefore, the MaxFFDuration may be equal to 300 seconds. A person of ordinary skill in the art will readily appreciate that the value of the MaxFFDuration listed above is merely an example and other values may be chosen. The comparator 304 may determine if a fast forward event has occurred using the equation:

(BroadcastTimeJump>MinReasonableCodeJump) &&
(BroadcastTimeJump>PresentationEventGap)
&& (PresentationEventGap<=MaxFFDuration).

If the comparator 304 determines a fast forward event was not detected (block 814), control advances to block 818. Otherwise, the comparator 304 transmits a message to the data collection server 124 to indicate that a fast forward event was detected and the television program was fast forwarded BroadcastTimeJump seconds (block 816) and control returns to block 708 of FIG. 7.

If a fast forward event is not detected (block 814), the comparator 304 then determines if a rewind event is detected (block 818). The rewind event may be detected by comparing the event gap time PresentationEventGap and the broadcast time jump BroadcastTimeJump to one another and to predetermined thresholds. For example, the comparator may determine whether the absolute value of the BroadcastTimeJump is greater than the MinReasonableCodeJump, whether the MinReasonableCodeJump is less than zero, and whether the PresentationEventGap is less than or equal to a maximum rewind duration MaxRWDuration. Using this calculation, a rewind event is detected when the gaps in presentation and broadcast times indicate that a first presented media content was broadcast after a second consecutively presented media content, provided that the error checking for reasonable code jump and maximum rewind duration is satisfied. The comparator 304 may assume a user will not rewind for more than five minutes and therefore, the MaxRWDuration may be equal to 300 seconds. A person of ordinary skill in the art will readily appreciate that the value of MaxRWDuration listed above is merely example and other values may be chosen. The comparator 304 may determine if a rewind event has occurred using the equation:

(|BroadcastTimeJump|>MinReasonableCodeJump)
&& (BroadcastTimeJump<0) &&
(PresentationEventGap<=MaxRWDuration).

If the comparator 304 determines a rewind event was not detected (block 818), control returns to block 708 of FIG. 7. Otherwise, the comparator 304 transmits a message to the data collection server 124 to indicate that a rewind event was detected and the television program was rewound |BroadcastTimeJump| seconds (block 820) and control returns to block 708 of FIG. 7.

Figure 9:
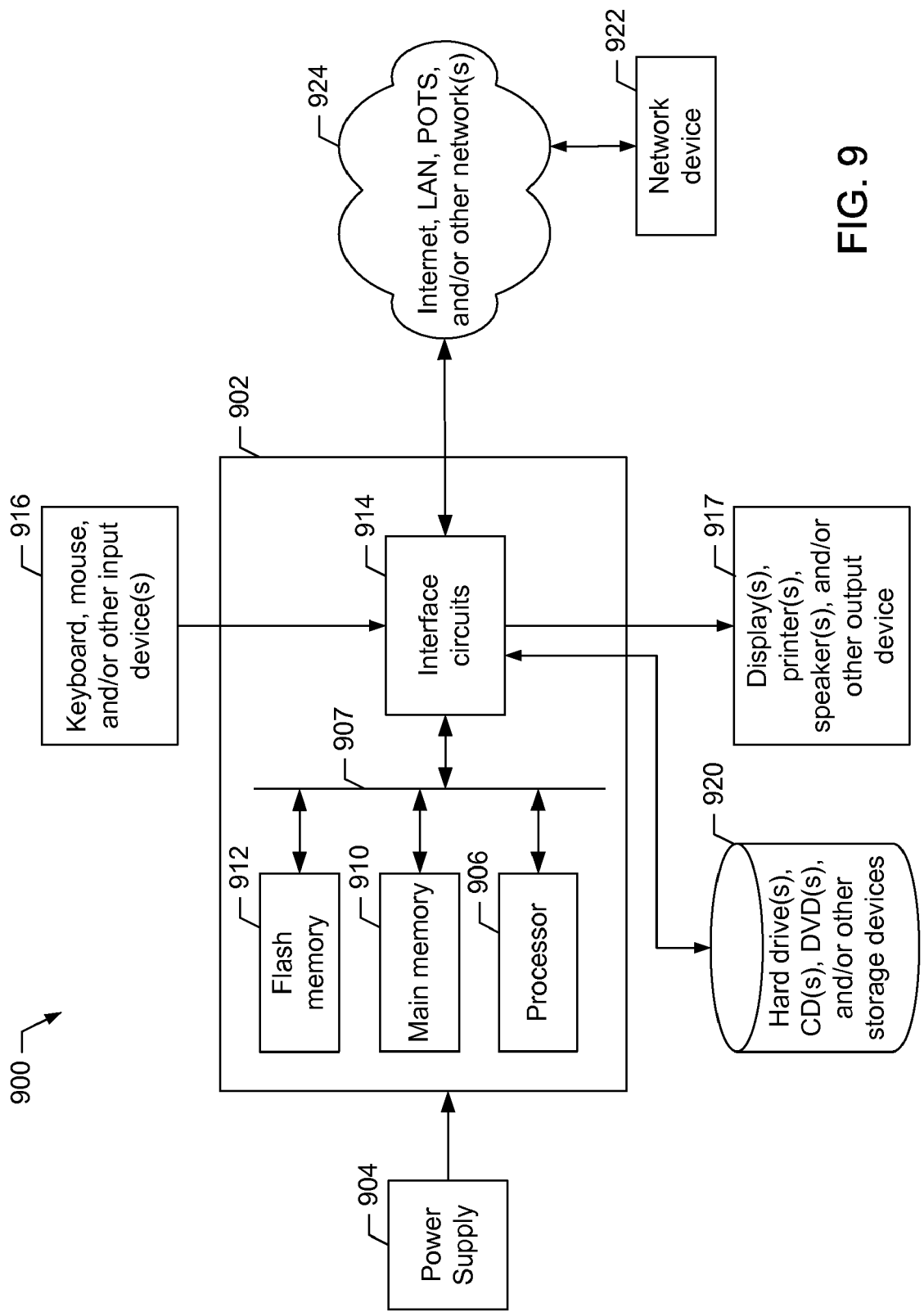
FIG. 9 is a block diagram of an example computer system that may be used to execute the machine readable instructions represented by FIGS. 6, 7, or 8 to implement the apparatus of FIG. 1 and/or FIG. 3.

FIG. 9 is a block diagram of an example computer system which may execute the machine reasonable instructions represented by the flowcharts of FIGS. 6-8 to implement some or all of the apparatus shown in FIGS. 1 and 3. The computer system 900 may be a personal computer (PC) or any other computing device. In the illustrated example, the computer system 900 includes a main processing unit 902 powered by a power supply 904. The main processing unit 902 may include a processor 906 electrically coupled by a system interconnect 908 to a main memory device 910, a flash memory device 912, and one or more interface circuits 914. In an example, the system interconnect 908 is an address/data bus. Of course, a person of ordinary skill in the art will readily appreciate that interconnects other than busses may be used to connect the processor 906 to the other devices 910-914. For example, one or more dedicated lines and/or a crossbar may be used to connect the processor 906 to the other devices 910-914.

The processor 906 may be any type of well known processor, such as a processor from the Intel Pentium® family of microprocessors, the Intel Itanium® family of microprocessors, the Intel Centrino® family of microprocessors, and/or the Intel XScale® family of microprocessors. The processor 906 also may be a Digital Signal Processor (DSP) or other processor optimized for signal processing functions and/or applications. In addition, the processor 906 may include any type of well known cache memory, such as static random access memory (SRAM). The main memory device 910 may include dynamic random access memory (DRAM) and/or any other form of random access memory. For example, the main memory device 910 may include double data rate random access memory (DDRAM). The main memory device 910 may also include non-volatile memory. In an example, the main memory device 910 stores a software program which is executed by the processor 906 in a well known manner. The flash memory device 912 may be any type of flash memory device. The flash memory device 912 may store firmware used to boot the computer system 900.

The interface circuit(s) 914 may be implemented using any type of well known interface standard, such as an Ethernet interface and/or a Universal Serial Bus (USB) interface. One or more input devices 916 may be connected to the interface circuits 914 for entering data and commands into the main processing unit 902. For example, an input device 916 may be a keyboard, mouse, touch screen, track pad, track ball, isopoint, and/or a voice recognition system.

One or more displays, printers, speakers, and/or other output devices 917 may also be connected to the main processing unit 902 via one or more of the interface circuits 914. The display 918 may be a cathode ray tube (CRT), a liquid crystal displays (LCD), or any other type of display. The display 918 may generate visual indications of data generated during operation of the main processing unit 902.

The computer system 900 may also include one or more storage devices 920. For example, the computer system 900 may include one or more hard drives, a compact disk (CD) drive, a digital versatile disk drive (DVD), and/or other computer media input/output (I/O) devices.

The computer system 900 may also exchange data with other devices 922 via a connection to a network 924. The network connection may be any type of network connection, such as an Ethernet connection, digital subscriber line (DSL), telephone line, coaxial cable, etc. The network 924 may be any type of network, such as the internet, a telephone network, a cable network, and/or a wireless network. The network devices 922 may be any type of network devices 922. For example, the network device 922 may be a client, a server, a hard drive, etc.

Although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A method of detecting a time shift event comprising:
    calculating a presentation gap value corresponding to a difference between a start presentation time of a second metering event and an end presentation time of a first metering event, the first metering event representative of a first time period in which a first program was continuously presented on an information presenting device, the second metering event representative of a second time period in which a second program was continuously presented on an information presenting device, and the first and second time periods being sequential;
    calculating a broadcast jump value corresponding to a difference between a start broadcast time of the second metering event and an end broadcast time of the first metering event;
    comparing, using a logic circuit, the broadcast jump value to a first threshold, comparing the presentation gap value to a second threshold, and comparing the broadcast jump value to the presentation gap value to determine whether a pause event, a fast forward event or a rewind event occurred.

2. A method as defined in claim 1, wherein the first and second metering events are both program content metering events or both final distributor metering events.

3. A method as defined in claim 1, wherein the first and second metering events comprise a program identifier, a presentation start time, a duration, and a broadcast start time.

4. A method as defined in claim 3, wherein at least one of the end broadcast time and the end presentation time associated with at least one of the first metering event and the second metering is computed by summing the presentation start time associated with the metering event and the duration associated with the metering event.

5. A method as defined in claim 1, wherein at least one of the first and second thresholds comprises at least one of a minimum reasonable code jump, a minimum pause time, a maximum pause time, a maximum fast forward duration, and a maximum rewind duration.

6. A method as defined in claim 1, wherein the time-shift event was generated by at least one of a digital video recorder, a personal video recorder, a set top box, a digital versatile disc recorder, a video cassette recorder, an internet streaming service, and a video on demand service.

7. A method as defined in claim 1, wherein at least one of the first and second programs comprise media content with interleaved advertisements.

8. A method as defined in claim 1, wherein the first program and the second program are the same.

9. An apparatus to detect a time-shift event associated with the presentation of media content comprising:
    an end time module to receive a first metering event representative of a first time period in which a first program was continuously presented on an information presenting device and a second metering event representative of a second time period in which a second program was continuously presented on an information presenting device and to calculate the times when the respective presentations were complete;
    a time jump module to calculate a presentation gap value corresponding to a difference between a start presentation time of the second metering event and an end presentation time of the first metering event and a broadcast jump value corresponding to a difference between a start broadcast time of the second metering event and an end broadcast time of the first metering event; and
    a comparator to compare, using a logic circuit, the broadcast jump value to a first threshold, the presentation gap value to a second threshold, and the broadcast jump value to the presentation gap value to determine whether a pause event, a fast forward event, or a rewind event occurred.

10. An apparatus as defined in claim 9, wherein the first and second metering events are both program content metering events or both final distributor metering events.

11. An apparatus as defined in claim 9, wherein the first and second metering events comprise a program identifier, a presentation start time, a duration, and a broadcast start time.

12. An apparatus as defined in claim 11, wherein at least one of the end broadcast time and the end presentation time associated with at least one of the first metering event and the second metering is computed by summing the presentation start time associated with the metering event and the duration associated with the metering event.

13. An apparatus as defined in claim 9, wherein at least one of the first and second thresholds comprises at least one of a minimum reasonable code jump, a minimum pause time, a maximum pause time, a maximum fast forward duration, and a maximum rewind duration.

14. An apparatus as defined in claim 9, wherein the time-shift event was generated by at least one of a digital video recorder, a personal video recorder, a set top box, a digital versatile disc recorder, a video cassette recorder, an internet streaming service, and a video on demand service.

15. An apparatus as defined in claim 9, wherein at least one of the first and second programs comprise media content with interleaved advertisements.

16. An apparatus as defined in claim 9, wherein the first program and the second program are the same.

17. A machine readable medium that is at least one of a compact disk, a digital versatile disk, an optical storage disk, a magnetic storage disk, a magnetic storage device, an optical storage device, a physical storage disk, a physical storage device, a floppy disk, a hard drive, a flash memory, a physical memory, a random access memory, a static random access memory, a dynamic random access memory, a double data rate random access memory, a cache memory, a non-volatile memory, a volatile memory, or a read only memory comprising instructions that, when executed, cause a machine to at least:

calculate a presentation gap value corresponding to a difference between a start presentation time of a second metering event and an end presentation time of a first metering event, the first metering event representative of a first time period in which a first program was continuously presented on an information presenting device, the second metering event representative of a second time period in which a second program was continuously presented on an information presenting device, and the first and second time periods being sequential;

calculate a broadcast jump value corresponding to a difference between a start broadcast time of the second metering event and an end broadcast time of the first metering event;

compare the broadcast jump value to a first threshold, compare the presentation gap value to a second threshold and compare the broadcast jump value to the presentation gap value to determine whether a pause event, a fast forward event or a rewind event occurred.

18. A machine readable medium as defined in claim 17, wherein the first and second metering events are both program content metering events or both final distributor metering events.

19. A machine readable medium as defined in claim 17, wherein the first and second metering events comprise a program identifier, a presentation start time, a duration, and a broadcast start time.

20. A machine readable medium as defined in claim 19, wherein at least one of the end broadcast time and the end presentation time associated with at least one of the first metering event and the second metering is computed by summing the presentation start time associated with the metering event and the duration associated with the metering event.

21. A machine readable medium as defined in claim 17, wherein the at least one of the first and second thresholds comprises at least one of a minimum reasonable code jump, a minimum pause time, a maximum pause time, a maximum fast forward duration, and a maximum rewind duration.

22. A machine readable medium as defined in claim 17, wherein the time-shift event was generated by at least one of a digital video recorder, a personal video recorder, a set top box, a digital versatile disc recorder, a video cassette recorder, an internet streaming service, and a video on demand service.

23. A machine readable medium as defined in claim 17, wherein at least one of the first and second programs comprise media content with interleaved advertisements.

24. A machine readable medium as defined in claim 17, wherein the first program and the second program are the same.

* * * * *

UNITED STATES PATENT AND TRADEMARK OFFICE
Certificate

Patent No. 8,238,727 B2　　　　　　　　　　　　　　　　　　　　　Patented: August 7, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David Howell Wright, Tampa, FL (US); and Charles Clinton Conklin, Oldsmar, FL (US).

Signed and Sealed this Thirteenth Day of May 2014.

FARID HOMAYOUNMEHR
*Supervisory Patent Examiner*
Art Unit 2495
Technology Center 2400